UNITED STATES PATENT OFFICE.

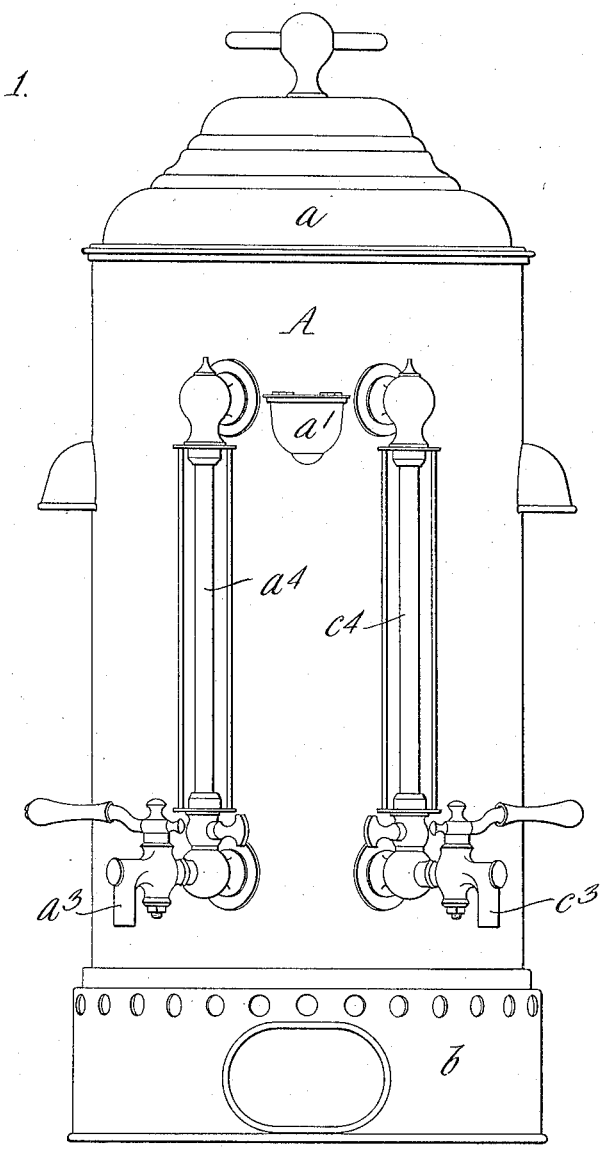

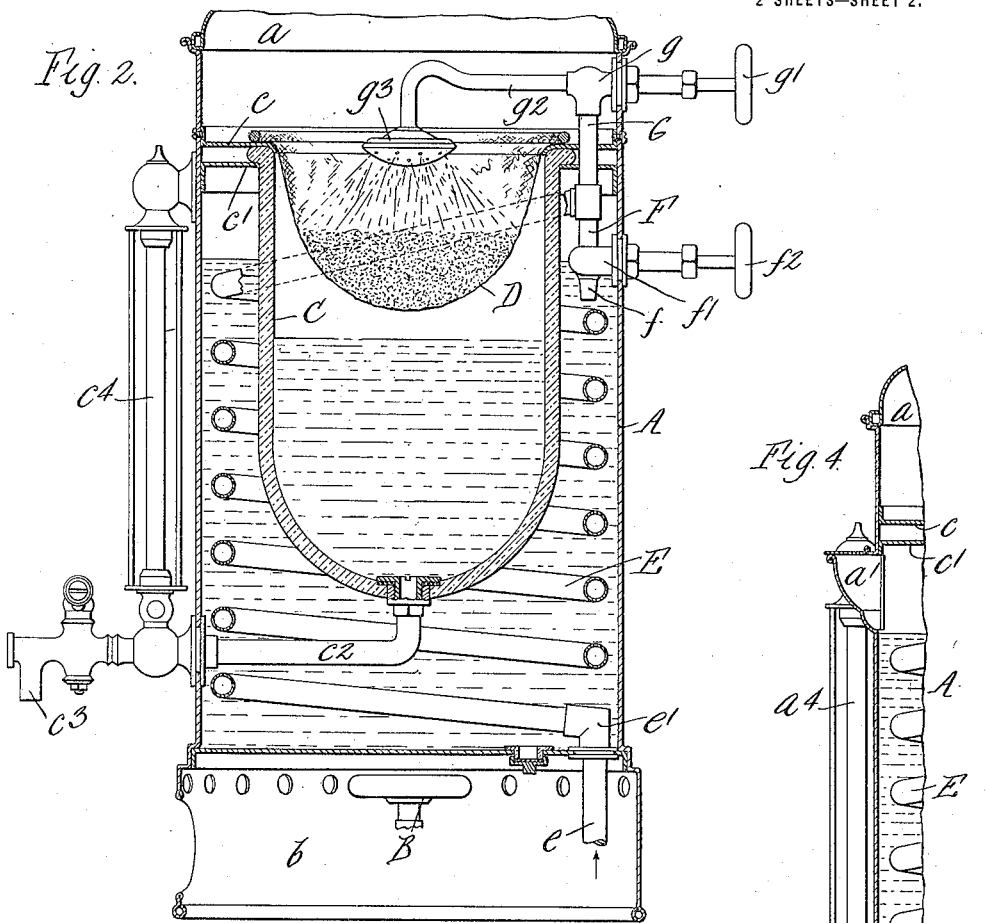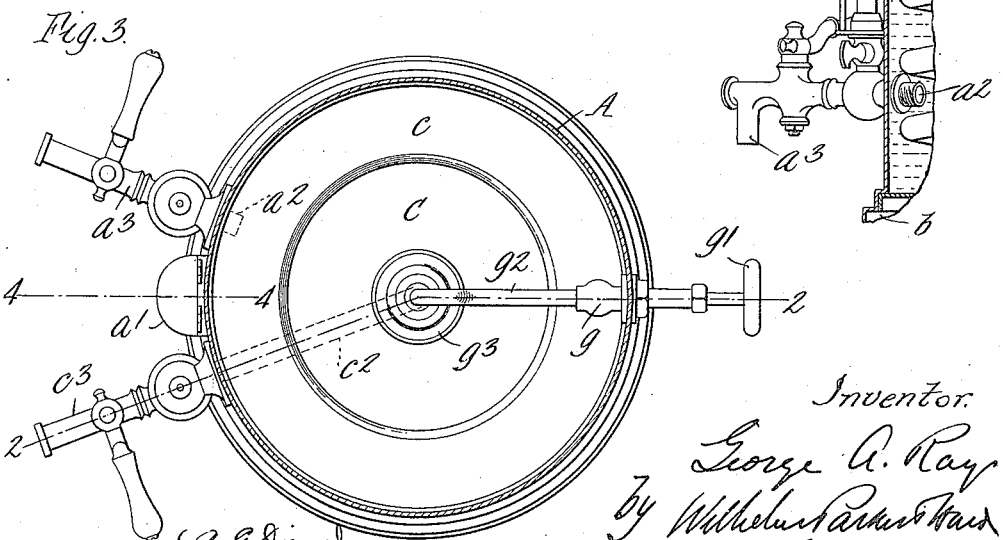

GEORGE A. RAY, OF BUFFALO, NEW YORK, ASSIGNOR TO GEORGE A. RAY MANUFACTURING COMPANY, OF BUFFALO, NEW YORK.

COFFEE-URN.

1,157,805.

Specification of Letters Patent.

Patented Oct. 26, 1915.

Application filed June 28, 1912. Serial No. 706,355.

*To all whom it may concern:*

Be it known that I, GEORGE A. RAY, a citizen of the United States, residing at Buffalo, in the county of Erie and State of New York, have invented a new and useful Improvement in Coffee-Urns, of which the following is a specification.

This invention relates to improvements in coffee urns of the type in which the receptacle for the liquid coffee is suspended in a boiler which is filled or partially filled with water and has suitable means for heating the water. In coffee urns of this type, as generally constructed, the hot water which is used in making the coffee and which must be added to the coffee from time to time is either drawn directly from the water which surrounds the coffee receptacle in the boiler, or else a separate boiler, or other source of hot water, is provided to furnish the water for the coffee. Both constructions are undesirable, the first because the water in the boiler around the coffee receptacle soon becomes stale and scale and other foreign matter tends to accumulate therein, the second on account of the extra expense entailed in providing a separate boiler and heating the water therein.

One object of the present invention is to overcome these objections by constructing an urn in which a supply of fresh hot water is provided for the coffee, which water is separate from the water in the boiler, and in which the heated water of the boiler is utilized for heating the separate fresh water supply, and a further object is to simplify and improve the construction of coffee urns in the manner hereinafter more specifically described and claimed.

In the accompanying drawings, consisting of two sheets: Figure 1 is a front elevation of a coffee urn embodying the invention. Fig. 2 is a fragmentary sectional elevation thereof on line 2—2, Fig. 3. Fig. 3 is a sectional plan view thereof. Fig. 4 is a fragmentary sectional elevation thereof on line 4—4, Fig. 3.

Like reference characters refer to like parts in the several figures.

The coffee urn in its general construction consists of the usual water boiler A, having a removable cover $a$, a filler opening $a'$ in which water can be poured if desired, a discharge pipe $a^2$ terminating in a faucet $a^3$ and a water gage $a^4$ arranged at the outer side of the boiler and communicating at its lower end with the pipe $a^2$ for indicating the amount of water in the boiler. The boiler rests upon a suitable support or base $b$, which in the construction shown is formed integral therewith and in which is arranged a gas or other heater B for heating the water in the boiler. Within the boiler is suspended the coffee receptacle C which in the construction shown is hung from annular brackets $c\ c'$ which embrace a lip on the upper edge of the receptacle and are secured to the inner wall of the boiler A. The coffee receptacle is provided with a discharge pipe $c^2$ leading from its bottom to the outer side of the boiler where it terminates in a faucet $c^3$, and a gage $c^4$ at the side of the boiler communicates at its lower end with the pipe $c^2$ for indicating the amount of coffee in the receptacle. Within the coffee receptacle is suspended the usual bag or textile filter D of canvas or other suitable material in which the coffee grounds are contained. All of these parts are common in coffee urns of this general type and may be of any suitable and desirable construction.

Within the boiler A is arranged a separate water receptacle or container from which water can be supplied to both the boiler and the coffee receptacle and which is adapted to be heated by the water in the boiler. Any suitable form of water container may be employed for this purpose. That shown consists of a coiled pipe E which is connected at its lower end with a suitable source of water supply, such as the feed pipe $e$ with which it is joined by a connection $e'$ which extends through the bottom of the boiler. In cities and towns having water systems the feed pipe may be connected directly with the water system. At its upper end, preferably within the boiler A, the pipe E is provided with two arms or branches F and G, one for supplying water to the boiler and the other for supplying water to the coffee receptacle. The branch F has a discharge nozzle or end $f$ which opens into the boiler, and a valve $f'$ for controlling the discharge from this nozzle, the valve having a handle $f^2$ at the outer side of the casing where it is accessible for operating the valve. The branch G is provided with a valve $g$ having an operating handle $g'$ at the outer side of the casing, and beyond the valve has a pipe $g^2$ arranged above the coffee receptacle C and provided with a spray nozzle $g^3$ for spraying the water onto the coffee grounds which are contained in the bag D. The valve handles $f^2$ and $g'$ are readily accessible, and when it is desired to fill the boiler or replenish the supply of water therein, this can be easily done by opening the valve $f'$. When water is required for the coffee receptacle it can be quickly added by opening the valve $g$. The water in the container or supply pipe E is heated by the water in the boiler, and the discharge outlet therefrom leading to the coffee receptacle is arranged at the highest point in this pipe where the water in the pipe will be hottest. The heat of the water in the boiler is thus utilized for heating the water in the separate water container or supply pipe E, and the supply pipe will thus furnish a supply of fresh hot water, whenever wanted, to the coffee receptacle which supply will be separate from and independent of the water in the boiler. The supply pipe also serves to supply fresh water to the boiler whenever needed. The pressure in the water system with which the supply pipe is connected acts to raise the water through the pipe to the discharge for the coffee receptacle and no pressure of steam in the boiler is required for this purpose. The boiler may, therefore, be constructed of comparatively light material and no tight closure or sealed joints are required for the upper end of the boiler about the coffee receptacle, such as are necessary in urns in which steam pressure is relied upon for forcing the water from the boiler to the coffee receptacle. This materially reduces the cost of construction and eliminates all danger from excessive steam pressure.

I claim as my invention:

1. In an urn, the combination with a water boiler adapted to contain water, of a circular liquid receptacle arranged in said boiler and substantially concentric therewith, of an annular water container arranged substantially concentrically in said boiler around said receptacle and submerged in the water in the boiler, means for supplying water to said boiler, and means for supplying water to said container and said liquid receptacle, substantially as set forth.

2. In an urn, the combination with a boiler containing water, of a liquid receptacle located in the boiler and partially submerged in said water and having an outlet pipe leading to the outside of the boiler, a heating coil located in the boiler around the liquid receptacle and concentrically therewith and having passages branching from the upper end thereof to conduct a liquid into said liquid receptacle and said boiler, and independent valves whereby the supply of liquid to the liquid receptacle and the boiler can be regulated, substantially as set forth.

Witness my hand this 25th day of June, 1912.

GEORGE A. RAY.

Witnesses:
E. R. CASE,
A. L. McGEE.